UNITED STATES PATENT OFFICE.

MARTIN L. MOWRER, OF DAYTON, OHIO.

PROCESS OF REDUCING AND SEPARATING MAIZE.

SPECIFICATION forming part of Letters Patent No. 251,919, dated January 3, 1882.

Application filed October 3, 1881. (No specimens.)

*To all whom it may concern:*

Be it known that I, MARTIN L. MOWRER, a citizen of the United States, of Dayton, in the county of Montgomery and State of Ohio, have invented certain new and useful Improvements in Processes of Reducing and Separating Maize, of which the following is a specification.

My invention relates to a process for the gradual reduction of Indian corn or maize and the separation of the product into different grades adapted to different uses.

It has been found that the use of corn as heretofore prepared is objectionable in the brewing or making of malt liquors, owing to the fact of the presence of fusel-oil in the grain, which deleteriously affects the beverage.

It is also known that the germ or softer portions of the grain contain more nutriment than the flinty parts; but I have discovered that these more nutritious parts do not make as good an article of beer or whisky as the flinty parts; and the object of my invention, which I will proceed to describe, is chiefly to separate these parts.

I prefer to take corn and brush and clean it in an ordinary wheat brush and separating machine, by which all foreign impurities are taken out by air-blast or suction. The cleaned grain is then carried through a wheat steamer and heater, to which sufficient moisture is admitted during the process of heating to cause the hulls to readily peel off in a hulling or hominy machine, through which it is next passed. The hominy or broken grain thus produced is then passed through an ordinary screen and suction or fan separator, which removes the bran or hulls and the flour, if any has been made. It is, however, obvious that an important part of my invention could be accomplished by commencing with the use of hulled corn, no matter by what process the hull had been removed. Therefore I do not wish to limit my invention to the means described for hulling the grain. Having got the article into the condition of hominy, it is then run through the first passage of a regrinding-mill, where the product must be sufficiently reduced to cause the separation of the germ and softer portions from the flinty portions. If this is not accomplished by the first pass of the gradual-reduction mill, a further reduction must be made, so as to allow a complete separation of the germ from the flinty portions. When thus partially reduced the product is run in an air-blast or suction separator, and any ordinary wheat separator or scalper may be used for this purpose. This scalper or separator will divide the product into two distinct grades, one composed of the germ and softer parts of the kernel and the other of the flinty portions. The first-named portion of the product contains the starch and oily portion of the grain and makes a very nutritious article of food. The flinty portion is still further reduced in gradual reduction mills until the product is of about the fineness of farina or grits, when it is again passed through an air-blast separator, in which all the meal is removed, leaving the hard grits free from any floury substance.

It is essential in brewing to have the product coarse. Hence care must be taken not to reduce the product too fine.

By the process of gradual reduction herein described I obtain a new product, which I call "corn-malt," which can be brewed and the product be entirely free from the effect of deleterious oils.

I claim—

1. The process herein described of reducing Indian corn into grits, the same consisting in first reducing the corn to hominy, then separating the hull and flour, and then subjecting the broken kernels to continuous gradual and successive reductions and separations of the flour after each reduction until the harder or flinty portions of the kernels are reduced to grits deprived entirely of the softer portions of flour, substantially in the manner and for the purpose described.

2. The process herein described of treating maize, which consists in steaming the grain, hulling it, separating the flinty or harder portions from the flour, and then subjecting the flinty or harder portions of the kernel to gradual and successive reductions and separations of the flour after each reduction until the flinty or harder portions are reduced to grits deprived entirely of the softer portions of flour, all substantially in the manner and for the purpose described.

In testimony whereof I have hereunto set my hand in the presence of two subscribing witnesses.

MARTIN L. MOWRER.

Witnesses:
EDWARD BOYD,
J. H. CHARLES SMITH.